G. B. AMBLER.
VEHICLE.
APPLICATION FILED APR. 21, 1909.
1,113,280.
Patented Oct. 13, 1914.
3 SHEETS—SHEET 1.
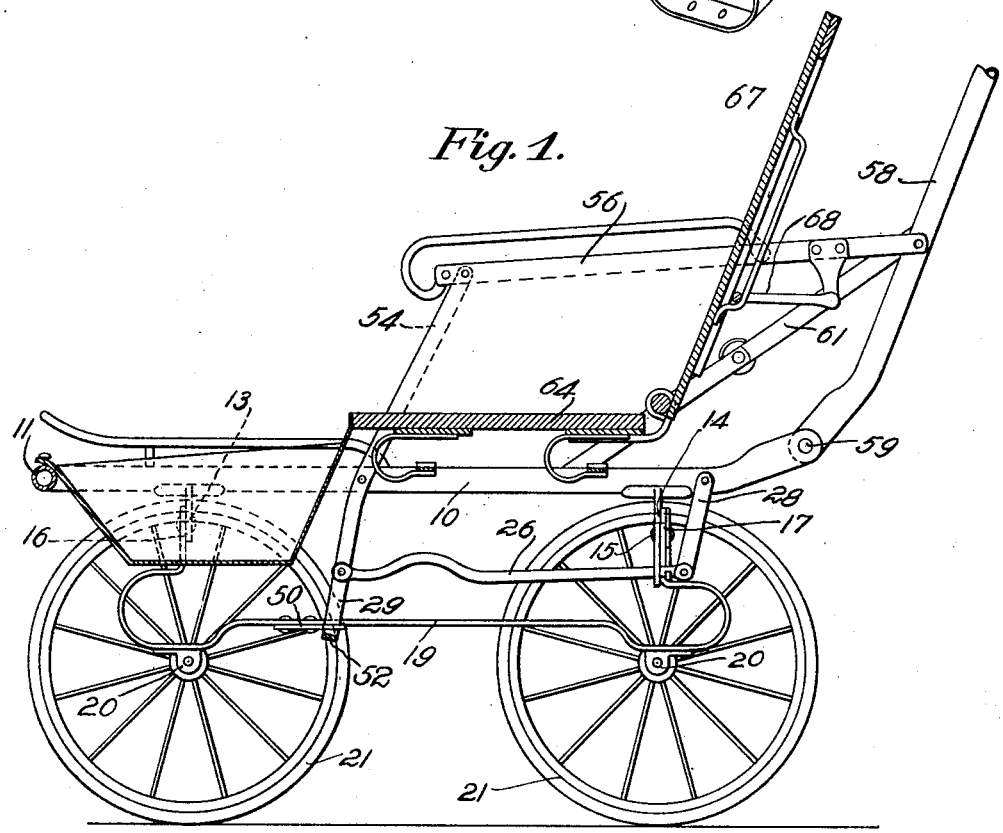

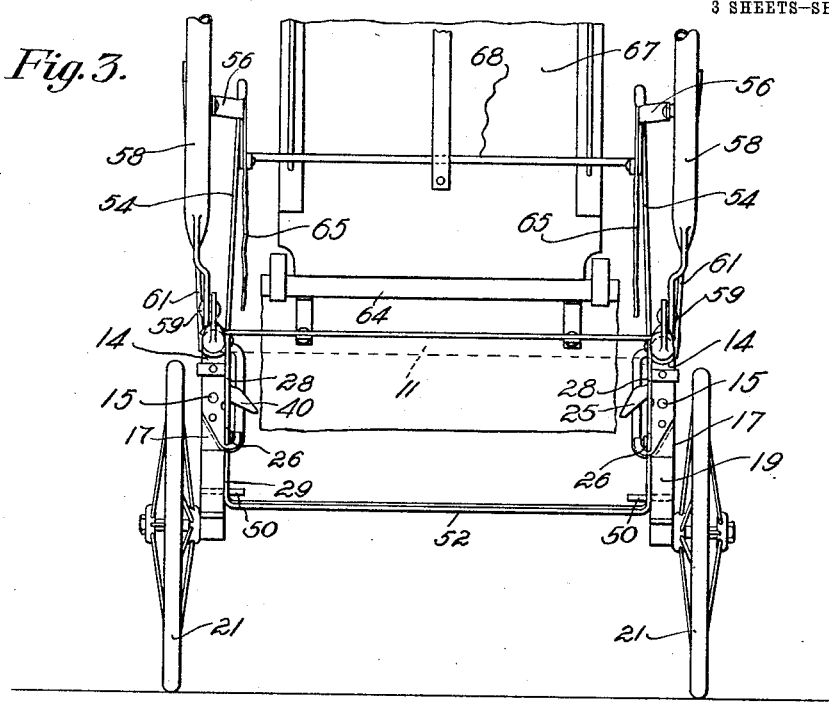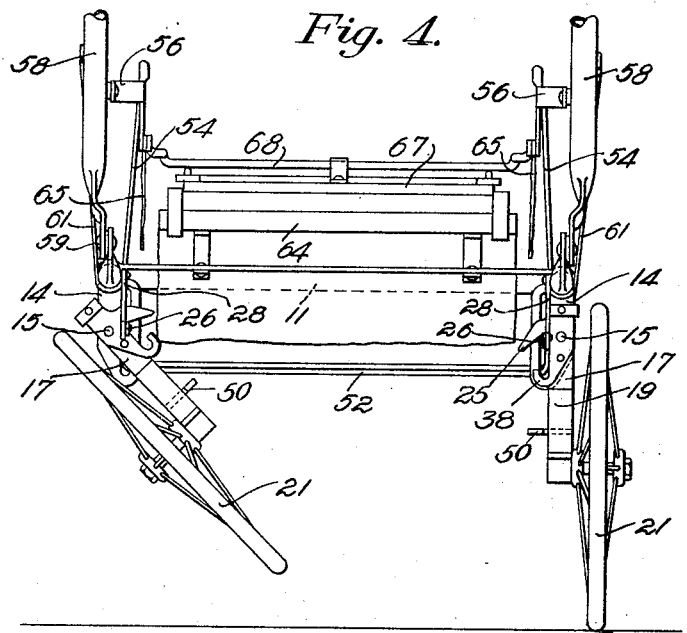

G. B. AMBLER.
VEHICLE.
APPLICATION FILED APR. 21, 1909.
1,113,280.
Patented Oct. 13, 1914.
3 SHEETS—SHEET 3.
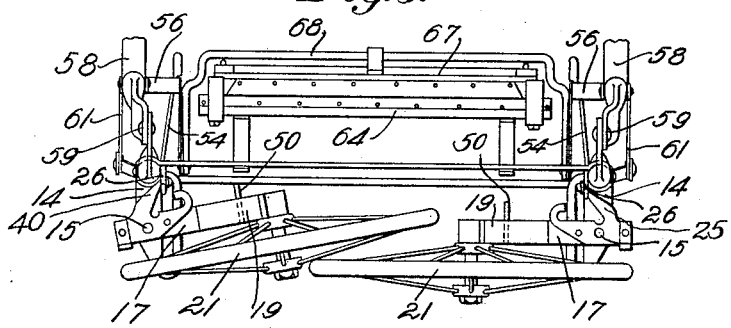
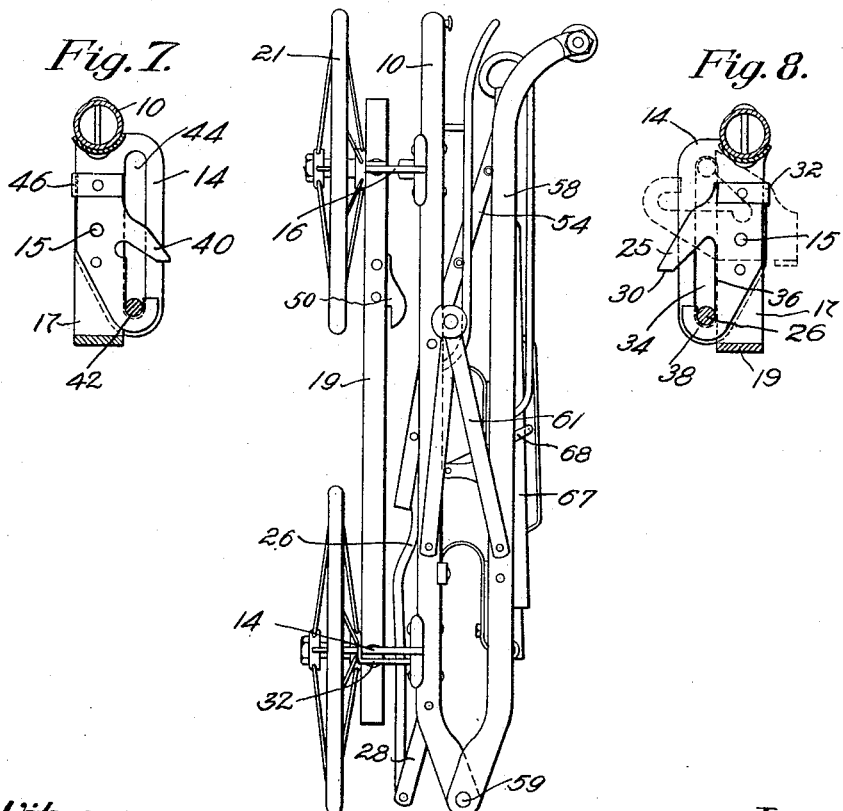
Witnesses:
Robert H. Kammler.
Horace H. Crossman.
Inventor:
George B. Ambler.
by Emery & Booth
Att'ys.

UNITED STATES PATENT OFFICE.

GEORGE B. AMBLER, OF LEOMINSTER, MASSACHUSETTS, ASSIGNOR TO F. A. WHITNEY CARRIAGE CO., OF LEOMINSTER, MASSACHUSETTS, A CORPORATION OF MASSACHUSETTS.

VEHICLE.

1,113,280.

Specification of Letters Patent.

Patented Oct. 13, 1914.

Application filed April 21, 1909. Serial No. 491,240.

*To all whom it may concern:*

Be it known that I, GEORGE B. AMBLER, a citizen of the United States, residing at Leominster, Worcester county, State of Massachusetts, have invented an Improvement in Vehicles, of which the following description, in connection with the accompanying drawings, is a specification, like letters on the drawings representing like parts.

This invention pertains to collapsible vehicles and more particularly, as regards the illustrative form herein shown and described, relates to so-called collapsible go-carts.

Among other objects the invention is designed to provide simplicity of structure combined with various improvements in construction and organization which render the collapsing and erecting mechanism of the vehicle positive and efficient in action, and provide for maintaining the parts securely in desired position.

The invention may be best understood by reference to a practicable embodiment shown for illustration and explanation in the accompanying drawings, in which,—

Figure 1 is a vertical side section on a median longitudinal plane of the illustrative vehicle; Fig. 2 is a detached perspective of certain parts hereinafter explained; Fig. 3 is a rear end elevation, viewed from the right in Fig. 1; Fig. 4, a view similar to Fig. 3, showing one of the wheel carrying frames partly folded; Fig. 5 is a rear elevation similar to Figs. 3 and 4 showing the vehicle completely collapsed; Fig. 6 is a side elevation of the collapsed vehicle of Fig. 5, the same being shown as standing on end. Figs. 7 and 8 are enlarged detached details of certain parts shown in Figs. 3, 4 and 5 and hereinafter more fully referred to.

Referring now to Fig. 1 the illustrative vehicle, of that type usually called a "collapsible go-cart," comprises a body 10, which may consist of a horizontally disposed U-shaped metal tube having the cross-piece 11 shown in dotted lines in Figs. 3 and 4. Attached to the longitudinal side bars of the body 10, are brackets 13, 14, to which are pivoted at 15 the upstanding ends 16, 17 of the wheel carrying frames 19. Each of the frames 19 has suitable axle supports 20, 20, in which are mounted the axles for the wheels 21, 21. Each frame 19 is so pivoted at 15 on its brackets 13 and 14 as to swing laterally (*i. e.* transversely of the cart) from the position shown in Fig. 3 through the intermediate position indicated at the left of Fig. 4 to the collapsed position shown in Fig. 5. The wheel carrying frames, with their wheels, may be thus folded by mechanical means, the same being exemplified by the mechanism about to be described.

Referring to Figs. 3 and 4 the upstanding end 17, of the wheel carrying frame 19 at the right has fixed thereto a tappet finger 25 which stands in position to be moved about the pivot 15 by a wheel frame controlling member 26. The relative positions of the controlling member 26 and the tappet finger 25, when the related wheel carrying frame is erected, is well shown in Figs. 2 and 8 (full lines).

Referring now to Fig. 1, a controlling member for moving the illustrative tappet finger 25, is shown as a rod 26, pivoted at its extremities to links 28 and 29 depending from the side bar 10 of the body frame. The side bar 10, links 28 and 29, and controlling member 26 together constitute what is known in the mechanics of linkwork as a "double-rocking-lever" mechanism of which the well-known parallel ruler is one type, and the so-called "parallel motion" linkage is another type. With such an arrangement the controlling member 26 may be appropriately swung, rearwardly in relation to the specific construction shown in the drawings, so as to engage the tappet finger 25 and fold the wheel-carrying means. The illustrative double-rocking-lever mechanism may be operated for its intended purposes by any practicable means.

Referring now to Fig. 8, as the illustrative rod 26 moves upwardly, it strikes the tappet finger 25 and rocks the latter, and the wheel carrying frame to which it is affixed, about the pivot 15 and into the folded position shown in Fig. 5. It will be noted that the illustrative controlling member 26 moves in substantial parallelism to the plane of the body of the vehicle; that is to say, in the specific construction the rod 26 is substantially horizontal throughout its travel. Also it will be noted that each controlling member 26 moves in substantial parallelism to the plane of its wheel carrying frame 16, 17, 19. When the controlling member 26 has reached the uppermost limit of its travel in folding the wheel frame, said controlling member 26 stands opposite a retaining portion 30 on the tappet finger 25 (see dotted lines Fig. 8) and thereby securely locks the tappet finger and consequently the wheel carrying frame in its extreme folded position. At the lowermost extreme of its movement the controlling member 26 occupies the position shown in full lines in Fig. 8. It then holds a stop lug 32 carried by the body plate of the tappet finger 25, against the outer edge of the bracket 14 which is rigidly supported by the side arm 10 of the frame. The bracket 14 may be provided with a lateral extension having a slot 34, vertically disposed to provide guiding means for the controlling member 26. By this means, the controlling member may be confined to desired positions prescribed by some device, such as the bracket 14, which is rigid with the body frame of the vehicle. For instance, when the controlling member 26 is in its uppermost position shown in dotted lines in Fig. 8, it is held by the slot 34 securely against the retaining face 30 of the tappet finger; and at the lowermost limit of its movement the controlling member 26 is firmly held to resist any tendency of the wheel frame to rock clock-wise about its pivot 15, while the stop lug 32 secures the wheel frame against contra-clockwise movement.

In order that the parts may be held tightly in desired position, the controlling member 26 and those parts of the body of the tappet finger with which said member co-acts, may be arranged to put the parts under more or less tension when the wheel frames are either folded or erected. For instance, the face 36 of the tappet finger body may serve after the manner of a cam so that as the controlling member descends it bears strongly against said surface 36 and forces the lower extremity of the tappet finger body toward the right, thereby pressing the stop lug 32 firmly against the bracket 14 and placing all the parts under considerable tension. In this connection the member 26 may serve as a wedge, so to speak, which is forced downwardly between the outer face of the slot and the surface 36 to wedge this apart and put the parts under tension, as described.

If desired, the body of the tappet finger 25 may have also a seat 38, conveniently in the form of a hook, which may engage the controlling member 26 on opposite sides when the parts are erected. Thus, the extremity of the hook 38 may contribute to prevent the wheel frame from swinging outwardly (contra-clockwise in Fig. 8) and in this respect the hook 38 may supplement or may be substituted for the stop lug 32.

The above described mechanism presents many features of advantage which will appear to those familiar with the art. For instance, the double-rocking-lever mechanism guides the controlling member 26 and causes it to move in parallelism with other parts of the vehicle as described, and thereby causes said controlling member to exert a substantially direct thrust upon the tappet finger 25, obviating the indirect cramping action of a single lever swung angularly upon a fulcrum to engage a tappet in a manner heretofore suggested in the art. Also, by the described tensioning of the parts, or an equivalent behavior, the relatively movable elements of the mechanism may be rendered substantially rigid and unitary in character in their erected and folded positions. Furthermore, the provision of the slot 34, or a practical equivalent thereof, contributes to retain the rotatable parts rigidly associated in proper positions, with the supporting bracket on the body frame of the vehicle.

While it is not indispensable that the other elements of the mechanism be used conjointly with a double-rocking-lever controlling member such as the bar 26, it is preferred that all be employed together. It is evident of course that the double-rocking-lever controlling member could be utilized to substantial advantage with other elements than those particularly described for illustration.

The exemplary mechanism shown in Fig. 8 and at the right in Figs. 3, 4 and 5, is substantially duplicated at the left in Figs. 3, 4 and 5. The corresponding parts at the left in said figures are shown in enlarged detail in Fig. 7. There are shown a tappet finger 40, a controlling member 42, and a slot 44. The finger 40 and its attached parts, including the wheel carrying frame, are folded by moving the same contra-clockwise about the pivot 15. There is provided also a stop lug 46 which serves the same purpose as the stop lug 32 of Fig. 8.

In order that the respective wheel carrying frames may be folded successively without interfering one with the other, it is desirable that the folding movement of one wheel frame begin at some stage earlier than that of the other. For instance, in the illustrative vehicle it is provided that the wheel carrying frame on the left in Figs. 3, 4 and 5 shall be folded in advance of the frame on the right. This may be accomplished by causing the initial coöperation between the tappet finger 40 and controlling member 42, to precede more or less that of the tappet finger 25 and controlling member 26; for instance, as in the illustrative mechanism, by positioning the tappet finger 40 lower, i. e. nearer to the member 42 than is the finger 25 to the member 26. The effect of this arrangement is well illustrated in Fig. 4 in which the wheel frame on the left is shown during its initial collapsing movement preceding that of the wheel frame on the right.

The described arrangement of parts adjacent each frame bracket 14 serves to hold the rear portions of the wheel frames substantially rigid with the body of the vehicle and to resist any tendency of the wheel frame to flex improperly either outwardly or inwardly so long as the parts are in erected position. It is desirable to provide further means at other parts of respective wheel frames to prevent the latter from so flexing; and this may be provided for conveniently by prolonging each link 29, 29 so that it shall engage its related wheel frame, as by entering a clip 50, such as is shown in Fig. 2. The normal stiffness of the link 29 assists to prevent flexing of the wheel frame; and this may be reinforced if desired by connecting the links 29, 29 at opposite sides of the vehicle by means of the cross-brace 52 shown in Figs. 2 and 3.

The folding and erecting mechanism hereinbefore described for illustration, may be operated in any practicable manner. For example, each link 29 may be supplied by the lower portion of a lever which has its upper arm 54 connected by a link 56 with a handle bar 58 pivoted at 59 to the side frame 10 (see Fig. 1). With this arrangement when the handle bars are rocked contra-clockwise in Fig. 1, the lever 54 and link 29 are similarly rocked, and the controlling member 26 is moved rearwardly and upwardly to perform its wheel carrying frame collapsing office.

The handle bars may be maintained in erected position by means of a toggle brace 61 having its ends pivoted respectively to a handle bar 58 and a side frame 10.

The links 56 may supply side arms for the spring supported seat 64; and side aprons 65 may be suspended from the links 56 (see Fig. 3).

A back 67 may be provided and supported by means of a bail 68 suitably secured to the opposite links 56, 56.

It is to be understood that the specific mechanism hereinbefore described has been disclosed merely for purposes of illustration; and the scope of the invention is by no means limited thereto. On the contrary, the specific illustrative mechanism is susceptible of wide variation by omission, addition and substitution as will appear to those skilled in the art, all within the proper scope of the subjoined claims. It is not indispensable that all of the features of the invention be used conjointly since they may be used separately to advantage.

Claims.

1. A vehicle of the character described comprising, in combination, a body frame; foldable wheel-carrying means connected to the frame; a pair of links pivoted to the body frame to move in a plane transverse to the direction of folding movement of the wheel-carrying means; a bar connecting said links to move therewith in substantial parallelism with said body frame; a tappet finger on the wheel-carrying means projecting into the plane of movement of said bar; guiding means proximate said tappet finger and rigid with the body frame to guide the movement of said bar; locking means on the wheel-carrying means to engage said bar at the respective limits of movement thereof in folding and erecting the wheel-carrying means; handle means pivoted on the body frame; and means connecting the handle means and one of the aforesaid links, whereby pivotal movement of the handle means rocks the said link and moves the said bar.

2. A vehicle of the character described comprising, in combination, a body frame; foldable wheel-carrying means connected to the frame; a pair of links pivoted to the body frame to move in a plane transverse to the direction of folding movement of the wheel-carrying means; a bar connecting said links to move therewith in substantial parallelism with said body frame; a tappet finger on the wheel-carrying means projecting into the plane of movement of said bar; locking means on the wheel-carrying means to engage said bar at the respective limits of movement thereof in folding and erecting the wheel-carrying means; handle means pivoted on the body frame; and means connecting the handle means and one of the aforesaid links.

3. A vehicle of the character described comprising, in combination, a body frame; foldable wheel-carrying means connected to the frame; a pair of links pivoted to the body frame to move in a plane transverse to the direction of folding movement of the wheel-carrying means; a bar connecting said links to move therewith in substantial parallelism with said body frame; a tappet finger on the wheel-carrying means projecting into the path of movement of said bar; and locking means on the wheel-carrying means to engage said bar at the respective limits of movement of said bar in folding and erecting the wheel-carrying means.

4. A vehicle of the character described comprising, in combination, a body frame; foldable wheel-carrying means connected to the frame; a pair of links pivoted to the body frame to move in a plane transverse to the direction of folding movement of the wheel-carrying means; a bar connecting said links to move therewith; a tappet finger on the wheel-carrying means projecting into the plane of movement of said bar; and guiding means rigid with the body frame to guide the movement of said bar.

5. A vehicle of the character described comprising, in combination, a body frame; foldable wheel-carrying means connected to the frame; a pair of links pivoted to the body frame to move in the same plane; a bar connecting said links to move therewith in substantial parallelism with said body frame; a tappet finger on the wheel-carrying means projecting into the path of movement of said bar; handle means pivoted on the body frame to move in a plane substantially parallel to the plane of movement of links; and means connecting the handle means and one of the aforesaid links, whereby pivotal movement of the handle means rocks the said link and moves the said bar.

6. A vehicle of the character described comprising, in combination, a body frame; foldable wheel-carrying means connected to the frame; a pair of links pivoted to the body frame; a bar connecting said links to move therewith; a tappet finger on the wheel-carrying means projecting into the plane of movement of said bar; handle means pivoted on the body frame; and means connecting the handle means and one of the aforesaid links.

7. A vehicle of the character described comprising, in combination, a body frame; foldable wheel-carrying means connected to the frame; a pair of links pivoted to the body frame to move in a plane transverse to the direction of folding movement of the wheel-carrying means; a bar connecting said links to move therewith in substantial parallelism with said body frame; and a tappet finger on the wheel-carrying means projecting into the plane of movement of said bar.

8. A vehicle of the character described comprising, in combination, a body frame; foldable wheel-carrying means pivoted to the frame, a bar movable in substantial parallelism with the axis of pivotal movement of the wheel-carrying means; and a tappet finger on the wheel carrying means projecting into the path of movement of said bar.

9. A vehicle of the character described comprising, in combination, a body frame; foldable wheel-carrying means pivoted to the frame; a bar movable in substantial parallelism with the axis of folding movement of the wheel-carrying means; means on the wheel-carrying means to coöperate with said bar; handle means movable on the body frame; and means connecting the handle means and said bar, whereby movement of the handle means moves the bar.

10. A vehicle of the character described comprising, in combination, a body; foldable wheel-carrying means; a link mounted on two movable pivots and connected to the body; and means connecting said link and the wheel-carrying means for folding the latter.

11. A vehicle of the character described, comprising in combination, a body; foldable wheel-carrying means; and folding members for the latter at opposite sides of the vehicle movable in the general direction of their lengths in substantial parallelism with the plane of the erected wheel-carrying means.

12. A vehicle of the character described, comprising in combination, a body; foldable wheel-carrying means; folding devices on the wheel-carrying means; and controlling members for the wheel-carrying means having successive substantially parallel positions engaging said devices and substantially perpendicular to the paths of movement of said devices.

13. A vehicle of the character described, comprising in combination, a body; foldable wheel-carrying means; folding devices on the wheel-carrying means; movable controlling members to coöperate with said devices for folding the wheel-carrying means; said controlling members, during their folding movements, being substantially perpendicular to the paths of movement of said devices.

14. A vehicle of the character described comprising in combination, a frame; foldable wheel carrying means connected thereto; and controlling means for the wheel carrying means comprising a pair of rocking levers, a member connecting said levers for coöperation with said wheel carrying means, and a handle connected to the vehicle for operating said levers and member.

15. A vehicle of the character described, comprising in combination, a body; a pair of levers connected to the body; a member connecting said levers and foldable wheel-carrying means having a part to coöperate with said member for folding the wheel-carrying means.

16. A vehicle of the character described comprising, in combination, a body frame; foldable wheel-carrying means; actuating members for folding the wheel-carrying means, movable bodily in the general direction of folding movement of the wheel-carrying means; and means on the wheel-carrying means coöperating with said actuating member.

17. A vehicle of the character described, comprising in combination, a body frame; wheel-carrying means at opposite sides of the body, and pivoted to the latter to fold transversely thereof; and separate locking cam means for each of the wheel-carrying means to lock the latter, when erected, to a rigid part of the body frame at a point between the pivot and the axle.

18. A vehicle of the character described comprising, in combination, a body frame; wheel-carrying means pivoted thereto; and locking means to lock the wheel-carrying means when erected to a rigid part of the body frame at a point below the pivot of the wheel-carrying means, and when folded at a point above said pivot.

19. A vehicle of the character described comprising, in combination, a body frame; foldable wheel-carrying means connected to the body frame; stop means contributing to determine the erected position of the wheel-carrying means; and wedge means interposed between a portion of the body frame and the wheel-carrying means to wedge the parts firmly in erected position.

20. A vehicle of the character described comprising, in combination, a body frame; foldable wheel-carrying means; means to hold the wheel-carrying means including a member adjustable to different positions, in erected and folded positions and means on the body frame to support said member in holding position.

21. A vehicle of the character described comprising, in combination, a body frame; foldable wheel-carrying means; means to hold the wheel-carrying means in erected and folded position; and means on the body frame against which said holding means wedges to hold the parts tensioned in the respective positions.

22. A vehicle of the character described comprising, in combination, a body frame; foldable wheel carrying means at opposite sides of the vehicle; and controlling means for the wheel-carrying means, respectively including a pair of rocking levers and a member connecting them, and means for causing the controlling means to fold the respective wheel-carrying means successively.

23. A vehicle of the character described comprising, in combination, a body frame; foldable wheel-carrying means; and controlling means therefor including a pair of rocking levers, a member connecting them, and means for bracing the wheel-carrying means in erected position.

24. A vehicle of the character described comprising, in combination, a body frame; foldable wheel-carrying means at opposite sides of the vehicle including a pair of rocking levers, a member connecting them, and controlling means for the wheel-carrying means; and means to brace the respective wheel-carrying means apart in erected position.

25. A vehicle of the character described comprising, in combination, a body frame; foldable wheel-carrying means; controlling means for the wheel-carrying means; a slotted member 14 mounted on the body frame to guide the controlling means; and a device 25 on the wheel-carrying means to coöperate with the controlling means.

26. A vehicle of the character described comprising, in combination, a body frame, foldable wheel carrying means; controlling means for the wheel carrying means; and stop means 30 and 36 coöperating with the controlling means respectively when the wheel-carrying means is folded and erected.

27. A vehicle of the character described comprising, in combination, a body frame; wheel carrying means; controlling means for the wheel-carrying means; and a finger 25 and hook 38 on the wheel-carrying means to coöperate with the controlling means.

28. A vehicle of the character described comprising, in combination, a body frame; foldable wheel-carrying means; a slotted member 14 mounted on the body frame; a controlling member movable in the slot thereof; and a unitary plate having means 25, 36 and 38 mounted on the wheel carrying means to coöperate with said controlling member.

29. A vehicle of the character described comprising, in combination, a body; foldable wheel-carrying means connected to the body; a controlling member pivotally connected to the body proximate one end thereof and extending to a point proximate the other end thereof and there engaging the wheel-carrying means; and means supporting said last named end of the controlling member for swinging movement on its pivotal support toward and from the body for folding the wheel-carrying means.

30. A vehicle of the character described, comprising in combination, a body; foldable wheel-carrying means connected to the body; a controlling member pivotally supported proximate one end of the body and extending substantially to the other end of the body and being there movable toward and from the body; and means on the wheel-carrying means in the path of such movement of the controlling means.

In testimony whereof, I have signed my name to this specification in the presence of two subscribing witnesses.

GEORGE B. AMBLER.

Witnesses:
HELEN A. MADIGAN,
GEO. H. ROUKES.

---

Copies of this patent may be obtained for five cents each, by addressing the "Commissioner of Patents, Washington, D. C."